United States Patent [19]

Schaetzer et al.

[11] Patent Number: 5,196,520
[45] Date of Patent: Mar. 23, 1993

[54] AZO DYES, THEIR PREPARATION AND THE USE THEREOF

[75] Inventors: Jürgen Schaetzer, Rheinfelden, Fed. Rep. of Germany; Jean-Marie Adam, Rosenau, France

[73] Assignee: Ciba-Geigy Corporation, Ardsley, N.Y.

[21] Appl. No.: 645,374

[22] Filed: Jan. 18, 1991

[30] Foreign Application Priority Data

Jan. 24, 1990 [CH] Switzerland ............. 227/90

[51] Int. Cl.⁵ ........................... C09B 31/10
[52] U.S. Cl. .................... 534/756; 534/764
[58] Field of Search ................ 534/756, 764

[56] References Cited

U.S. PATENT DOCUMENTS 3,900,460 8/1975 Dehnert .................. 260/160

FOREIGN PATENT DOCUMENTS 2030380 11/1970 France .
2024265 1/1980 United Kingdom .

Primary Examiner—Marianne M. Cintins
Assistant Examiner—John Peabody
Attorney, Agent, or Firm—Marla J. Mathias; Edward McC. Roberts

[57] ABSTRACT

The invention relates to azo dyes of formula

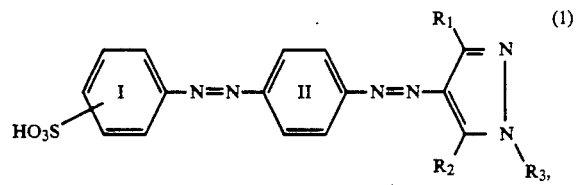

wherein $R_1$ is hydrogen or $C_1$-$C_4$alkyl, $R_2$ is $C_2$-$C_4$alkyl, $R_3$ is hydrogen, $C_1$-$C_4$alkyl or unsubstituted or substituted $C_5$-$C_7$cycloalkyl or phenyl, and the benzene rings I and II are unsubstituted or substituted.

The azo dyes are suitable for dyeing or printing synthetic polyamide materials, especially in conjunction with other dyes and, preferably, from short liquors. The azo dyes have good allround properties, in particular good affinity.

6 Claims, No Drawings

AZO DYES, THEIR PREPARATION AND THE USE THEREOF

The present invention relates to novel azo dyes, to their preparation and to the use thereof for dyeing and printing fibre materials, especially textile fibre materials.

Specifically, the invention relates to azo dyes of formula

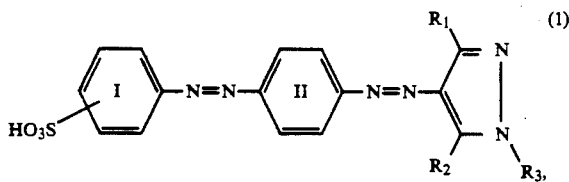

wherein $R_1$ is hydrogen or $C_1$-$C_4$alkyl, $R_2$ is $C_2$-$C_4$alkyl, $R_3$ is hydrogen, $C_1$-$C_4$alkyl or unsubstituted or substituted $C_5$-$C_7$cycloalkyl or phenyl, and the benzene rings I and II are unsubstituted or substituted.

The azo dyes of formula (1), wherein $R_1$ and $R_2$ have different meanings and $R_3$ is additionally not hydrogen, are normally obtained in the form of mixtures of isomers of the compounds of formulae

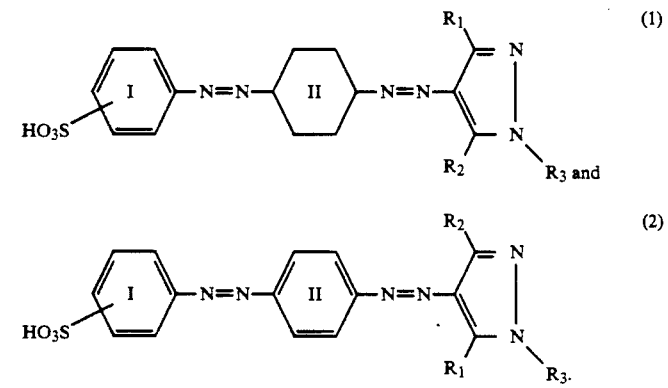

Throughout this specification, the expression "azo dyes of formula (1)" will be understood as meaning also the above mixtures of isomers.

$R_1$ and $R_3$ as $C_1$-$C_4$alkyl in formula (1) are suitably each independently of the other methyl, ethyl, propyl, isopropyl, butyl, isobutyl, sec-butyl or tert-butyl.

$R_2$ as $C_2$-$C_4$alkyl in formula (1) is ethyl, propyl, isopropyl, butyl, isobutyl, sec-butyl or tert-butyl.

$R_3$ as $C_5$-$C_7$cycloalkyl in formula (1) may be unsubstituted cyclohexyl or cyclohexyl which is substituted by $C_1$-$C_4$alkyl, such as methyl or ethyl.

$R_3$ as phenyl in formula (1) may be unsubstituted phenyl or phenyl which is substituted by $C_1$-$C_4$alkyl, such as methyl or ethyl, $C_1$-$C_4$alkoxy, such as methoxy or ethoxy, $C_2$-$C_4$alkanoylamino, such as acetylamino or propionylamino, or by hydroxy, sulfo, cyano, or halogen such as fluoro, chloro or bromo.

Suitable substituents of the benzene rings I and II are each independently of the other $C_1$-$C_4$alkyl such as methyl or ethyl, $C_1$-$C_4$alkoxy such as methoxy or ethoxy, $C_2$-$C_4$alkanoylamino such as acetylamino or propionylamino, hydroxy, sulfo, cyan, nitro, sulfamoyl, or halogen such as fluoro, chloro or bromo. Preferred substituents of the benzene rings I and II are $C_1$-$C_4$alkyl, $C_1$-$C_4$alkoxy, $C_2$-$C_4$alkanoylamino and halogen, preferably methyl, methoxy and chloro, preferably methoxy.

Preferred azo dyes of formula (1) are those wherein the benzene ring I is substituted by only one sulfo group.

Further preferred azo dyes of formula (1) are those wherein $R_1$ is $C_1$-$C_4$alkyl, preferably methyl or ethyl.

Also preferred are azo dyes of formula (1), wherein $R_2$ is ethyl.

Still further preferred azo dyes of formula (1) are those wherein $R_3$ is hydrogen.

Also preferred are azo dyes of formula (1), wherein the sulfo group is attached to the benzene ring I in meta- or para-position to the azo group.

Particularly preferred azo dyes of formula (1) are those wherein $R_1$ is methyl or ethyl and $R_2$ is ethyl, preferably wherein $R_1$ is methyl or ethyl and $R_2$ is ethyl, and the sulfo group is attached to the benzene ring I in meta- or para-position to the azo group.

Very particularly preferred azo dyes of formula (1) are those wherein $R_1$ is methyl or ethyl, $R_2$ is ethyl and $R_3$ is hydrogen, especially those wherein $R_1$ is methyl or ethyl, $R_2$ is ethyl and $R_3$ is hydrogen, and the sulfo group is attached to the benzene ring I in meta- or para-position to the azo group.

Particularly important azo dyes are of those of formula

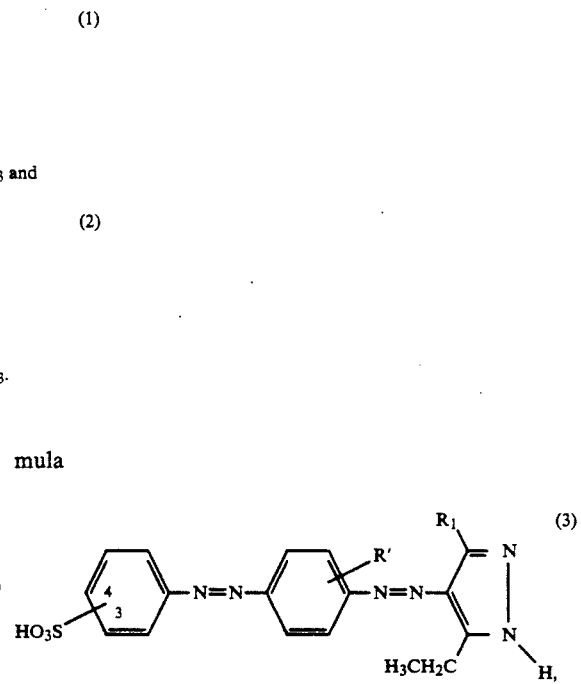

wherein $R_1$ is methyl or ethyl and $R'$ is hydrogen or methoxy, and the sulfo group is attached to the benzene ring in the indicated 3- or 4-position.

Particularly interesting azo dyes are those of formulae

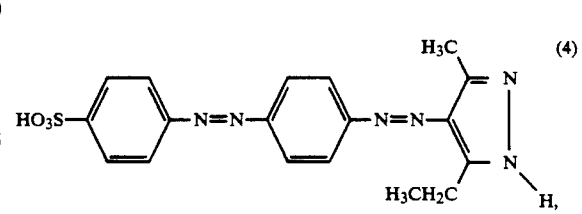

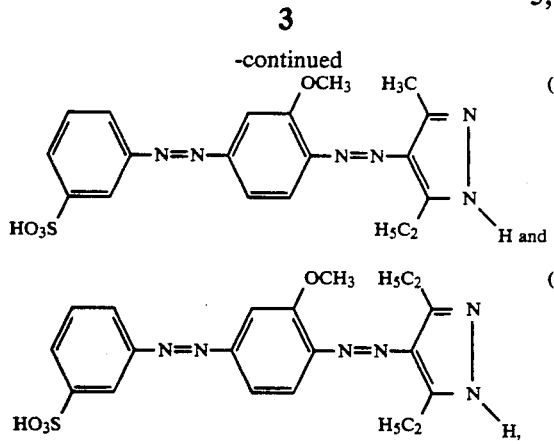

especially the dyes of formulae (5) and (6).

The invention further relates to a process for the preparation of azo dyes of formula (1), which comprises diazotising an amine of formula

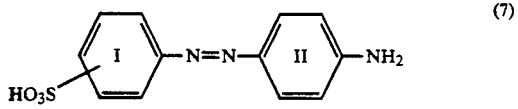

and coupling the diaziotised amine to a coupling component of formula

and reacting the reaction product of formula

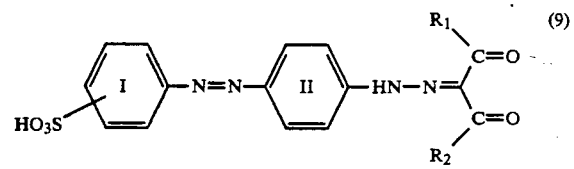

with a hydrazine of formula

wherein $R_1$, $R_2$ and $R_3$ are as defined for formula (1) and the benzene rings I and II are unsubstituted or substituted.

The diazotisation of the amine of formula (7) is normally carried out by treatment with nitrous acid in an aqueous solution of mineral acid at low temperature, and the coupling to the coupling component of formula (8) is carried out in the acid, neutral or weakly alkaline pH range, preferably in the range from 2 to 6.

The reaction of the compound of formula (9) with a hydrazine of formula (10) is carried out in water, an organic solvent such as methanol, ethanol, pyridine or glacial acetic acid, or in a mixture of water and an organic solvent such as water/acetic acid, in the temperature range from 40° to 100° C., preferably from 40° to 60° C.

The amine of formula (7), the coupling component of formula (8) and the hydrazine of formula (10) are known per se or can be prepared by methods analogous to those for obtaining known compounds.

The amine of formula (7) may typically be 4-aminoazobenzene-2'-, -3'- or -4'-sulfonic acid.

The coupling component of formula (8) may typically be 2,4-hexanedione, 3,5-heptandione, 2,4-heptanedione, 3,5-octanedione and 4,6-octanedione.

The compound of formula (10) may typically be hydrazine, methyl-, ethyl-, propyl-, isopropyl-, butyl-, isobutyl-, sec-butyl-, tert-butyl- or cyclohexylhydrazine.

Preferred embodiments of the process of the invention comprise using an amine of formula (7), wherein the benzene ring I is substituted by only one sulfo group;

using an amine of formula (7), wherein the sulfo group is attached to the benzene ring I in meta- or para-position to the azo group;

using a coupling component of formula (8), wherein $R_1$ is methyl or ethyl;

using a coupling component of formula (8), wherein $R_2$ is ethyl;

using a compound of formula (10) wherein $R_3$ is hydrogen.

In the process of this invention it is especially preferred to use a coupling component of formula (8), wherein $R_1$ is methyl or ethyl and $R_2$ is ethyl. It is preferred to diazotise an amine of formula (7), wherein the sulfo group is attached to the benzene ring I in meta- or para-position to the azo group, and to couple the diazotised amine to a coupling component of formula (8), wherein $R_1$ is methyl or ethyl and $R_2$ is ethyl.

A particularly preferred embodiment of the process of this invention for the preparation of azo dyes of formula (1) comprises diazotising an amine of formula (7), wherein the sulfo group is attached to the benzene ring I in meta- or para-position to the azo group, and coupling the diazotised amine to a coupling component of formula (8), wherein $R_1$ is methyl or ethyl and $R_2$ is ethyl, and reacting the reaction product with a compound of formula (10), wherein $R_3$ is hydrogen.

A particularly important embodiment of the process of this invention for the preparation of azo dyes of formula (1) comprises diazotising an amine of formula

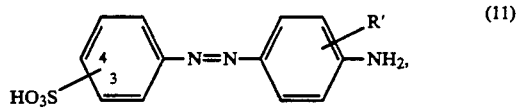

wherein R' is hydrogen or methoxy and the sulfo group is attached to the benzene ring in 3- or 4-position, and coupling the diazotised amine to a coupling component of formula

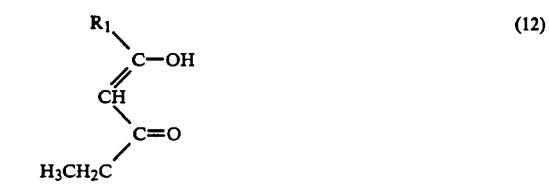

wherein $R_1$ is methyl or ethyl, and reacting the reaction product with a compound of formula $H_2N-NH_2$ (13).

The invention further relates to the trichromatic dyeing or printing of natural and synthetic polyamide materials with a mixture of dyes comprising at least one yellow or orange dyeing dye of formula (1), together with at least one red dyeing dye and at least one blue dyeing dye, in respect of which dye of formula (1) the preferences cited above apply. As yellow or orange dyeing dye it is preferred to use a dye of formula (3).

In the process of this invention for trichromatic dyeing or printing it is preferred to use at least one dye of formula (1) together with at least one of the red dyeing dyes of formula (14), (15) and (16):

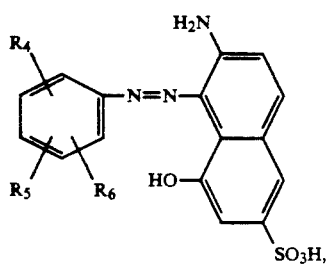  (14)

wherein $R_4$ is unsubstituted or substituted $C_1-C_8$alkyl, halogen, phenylsulfonyl or phenoxysulfonyl, each unsubstituted or substituted in the phenyl ring by $C_1-C_4$alkyl, or is cyclohexyloxycarbonylamino, $C_2-C_4$alkanoylamino, benzoylamino which is unsubstituted or substituted in the phenyl ring by halogen, or is 1-azacycloheptane-N-sulfonyl or

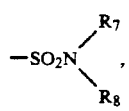

wherein $R_7$ is $C_1-C_8$alkyl, phenyl or cyclohexyl, or $C_1-C_4$alkyl-substituted phenyl or cyclohexyl, and $R_8$ is hydrogen or $C_1-C_8$alkyl, $R_5$ is hydrogen, halogen, $C_1-C_8$alkyl or $C_2-C_4$alkanoylamino, and $R_6$ is hydrogen or halogen,

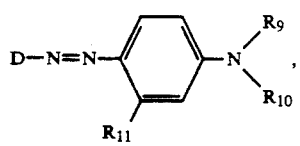  (15)

wherein D is unsubstituted or substituted phenyl, thiophenyl or benzothiazolyl, $R_9$ is $C_1-C_8$alkyl, $R_{10}$ is unsubstituted or substituted $C_1-C_8$alkyl, and $R_{11}$ is hydrogen or $C_1-C_4$alkyl, and

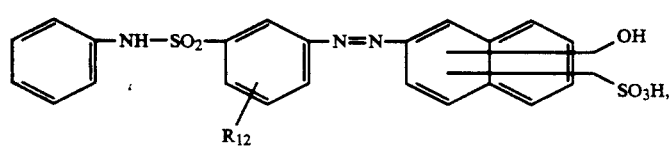  (16)

wherein $R_{12}$ is $C_1-C_4$alkyl, together with at least one blue dyeing dye of formula

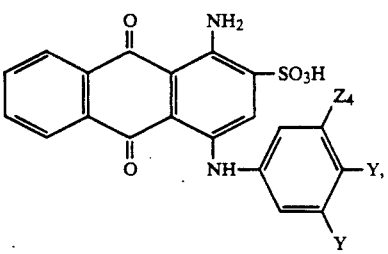  (17)

wherein one Y is hydrogen or methyl and the other Y is $C_2-C_4$alkanoylamino or $C_2-C_4$hydroxyalkylsulfamoyl, and $Z_4$ is hydrogen or methyl, in respect of which dye of formula (1) the preferences indicated above apply. As yellow or orange dyeing dye it is preferred to use a dye of formula (3).

The dyes of formulae (14), (15), (16) and (17) used in the process of this invention for trichromatic dyeing or printing are known per se or can be prepared by methods analogous to those employed for preparing known dyes.

$R_4$, $R_5$, $R_7$ and $R_8$ in formula (14) and $R_9$ and $R_{10}$ in formula (15) as $C_1-C_8$alkyl are each independently of one another suitably methyl, ethyl, propyl, isopropyl, butyl, sec-butyl, tert-butyl, isobutyl, pentyl, hexyl, heptyl and octyl. Preferably $R_4$, $R_5$, $R_7$, $R_8$, $R_9$ and $R_{10}$ are $C_1-C_4$alkyl.

The substituent $R_4$ in formula (14) as $C_1-C_8$alkyl may be substituted by, for example, halogen such as chloro or bromo and, preferably, fluoro. A typical example is the trifluoromethyl radical.

The substituent $R_{10}$ in formula (15) as $C_1-C_8$alkyl may be substituted by, for example, sulfo, sulfato or phenyl. Typical examples are benzyl, β-sulfoethyl, γ-sulfopropyl and β-sulfatoethyl.

Suitable halogens represented by $R_4$, $R_5$ and $R_6$ in formula (14) may each independently of one another be fluoro, bromo or, preferably, chloro.

$R_4$ in formula (14) as benzoylamino may be substituted in the phenyl ring by halogen such as fluoro, bromo or, preferably, chloro.

$R_7$ as phenyl or cyclohexyl as well as $R_4$ as phenylsulfonyl or phenoxysulfonyl may be substituted by $C_1-C_4$alkyl such as methyl, ethyl, propyl, isopropyl, butyl, sec-butyl, tert-butyl or isobutyl, preferably methyl.

$R_{11}$ in formula (15) and $R_{12}$ in formula (16) as $C_1-C_4$alkyl are each independently of the other, for example, methyl, ethyl, propyl, isopropyl, butyl, sec-butyl, tert-butyl or isobutyl, preferably methyl.

$R_4$ and $R_5$ in formula (14) and Y in formula (17) as $C_2-C_4$alkanoylamino are each independently of one another acetylamino, propionylamino or butyrylamino.

The radical D in formula (15) may be substituted by halogen such as fluoro, chloro or bromo, $C_1-C_4$alkyl such as methyl, ethyl, propyl, isopropyl, butyl, sec-butyl, tert-butyl or isobutyl, $C_1-C_4$alkoxy such as methoxy, ethoxy, propoxy or butoxy, $C_1-C_4$alkoxycarbonyl such as methoxycarbonyl or ethoxycarbonyl, sulfo, or $C_1$-$C_4$alkylsulfamoyl which is unsubstituted or substituted in the alkyl moiety by sulfo, for example methylsulfamoyl, ethylsulfamoyl or β-sulfoethylsulfamoyl.

Y as $C_{2-4}$hydroxylalkylsulfamoyl in formula (17) may suitably be β-hydroxyethylsulfamoyl, β-hydroxypropylsulfamoyl, γ-hydroxypropylsulfamoyl or β-hydroxybutylsulfamoyl.

In the process of this invention for trichromatic dyeing or printing it is preferred to use at least one of the red dyeing dyes of formulae (14), (15) and (16). In the dye of formula (14), $R_4$ is trifluoromethyl, chloro, acetylamino, —$SO_2N(n$—$C_4H_9)_2$, phenoxysulfonyl, phenylsulfonyl, 1-azacycloheptane-N-sulfonyl, cyclohexyloxycarbonylamino, benzoylamino which may be substituted in the phenyl ring by chloro or phenylsulfamoyl which may be substituted in the phenyl ring by methyl, cyclohexylsulfamoyl, N-($C_1$-$C_2$alkyl)phenylsulfamoyl or N-($C_1$-$C_2$alkyl)cyclohexylsulfmaoyl, $R_5$ is hydrogen, methyl, chloro or acetylamino, and $R_6$ is hydrogen or chloro, and, in the dye of formula (15), D is phenyl which is substituted by chloro, sulfo, methylsulfamoyl, ethylsulfamoyl or β-sulfoethylsulfamoyl, thiophenyl which is substituted by methyl, methoxycarbonyl or ethoxycarbonyl, or benzothiophenyl which may be substituted by methyl, methoxy or sulfo, $R_9$ is ethyl, $R_{10}$ is ethyl, β-sulfatoethyl, —$(CH_2)_{\overline{2-3}}SO_3$ H or benzyl, and $R_{11}$ is hydrogen or methyl, and, in the dye of formula (16), $R_{12}$ is methyl.

It is particularly preferred to use at least one of the red dyeing dyes of formula

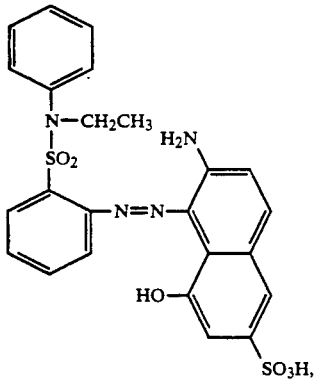

(18)

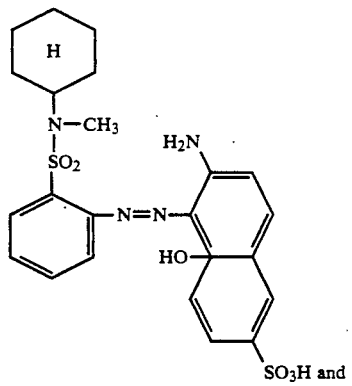

(19)

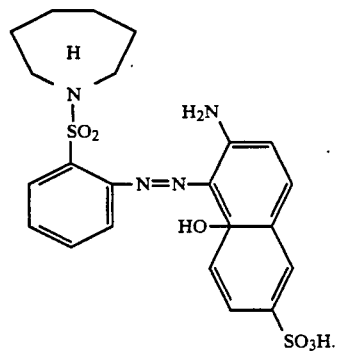

(20)

In the process of this invention it is also particularly preferred to use at least one of the blue dyeing dyes of formulae

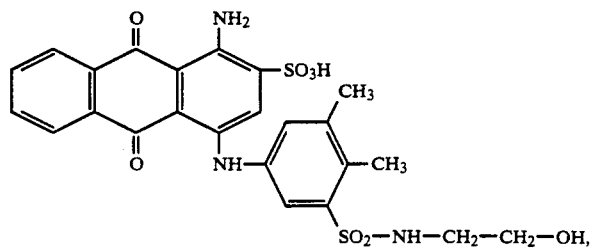

(21)

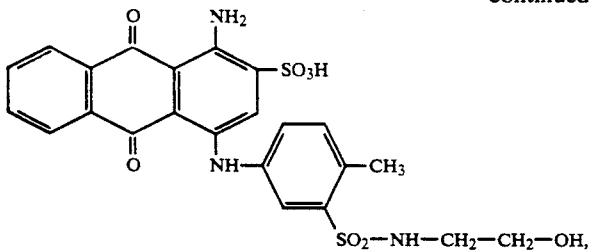     (22)

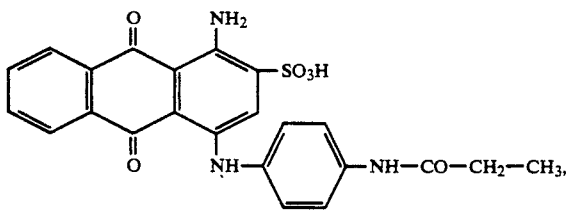     (23)

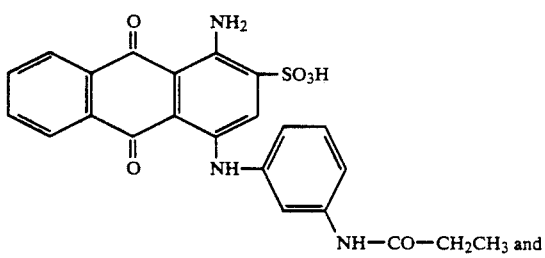     (24)

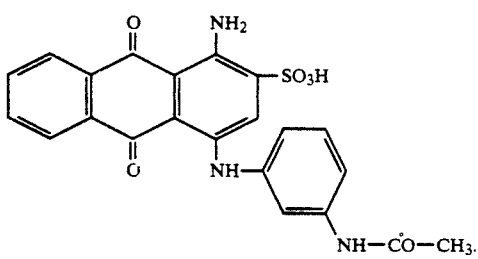     (25)

If a mixture of blue deying dyes is used in the process of the invention, then it is preferred to use a mixture of the blue dyeing dyes of formula (21) or (22) with a dye of formula (23), (24) or (25). It is most preferred to use a mixture of the blue dyeing dyes of formulae

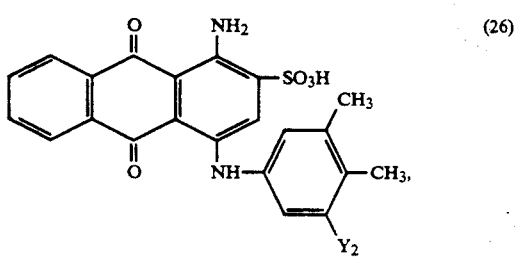     (26)

wherein $Y_2$ is a $C_{2-4}$hydroxyalkylsulfamoyl radical, and

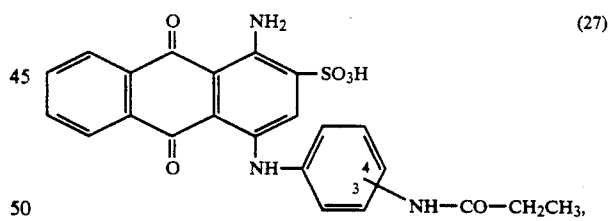     (27)

wherein the radical —NH—CO—CH$_2$CH$_3$ is in 3- or 4-position.

In the process of this invention for trichromatic dyeing or printing it is most especially preferred to use at least one dye of formula (1) together with at least one red dyeing dye of formulae (18) (19) and (20), preferably (18) and (19), and at least one of the blue dyeing dyes of formulae (21), (22), (23), (24) and (25), in respect of which dye of formula (1) the preferences indicated above apply. As yellow or orange dyeing dye it is preferred to use a dye of formula (3).

A very particularly preferred embodiment of the process of this invention for trichromatic dyeing or printing comprises using at least one dye of formula (1) together with a red dyeing dye of formula (19) and a blue dyeing dye of formula (21), in respect of which dye of formula (1) the preferences indicated above apply. As yellow or orange dyeing dye it is preferred to use a dye of formula (3).

Dye mixtures used in the process of this invention can be prepared by mixing the individual dyes. Mixing is performed typically in suitable mills such as ball and pin mills, as well as in kneaders or mixers.

The dye mixtures can also be prepared by spray drying the aqueous mixtures of the dyes.

The dyes of formula (1) as well as the dyes used in the process for trichromatic dyeing or printing are either in the form of their free sulfonic acids or, preferably, as salts thereof.

Suitable salts are typically the alkali metal, alkaline earth metal or ammonium salts or the salts of an organic amine. Illustrative examples are the sodium, lithium, potassium or ammonium salts or the salt of mono-, di- or triethanolamine.

Further additives such as sodium chloride or dextrin are normally added to the dyes of formula (1) and to the dyes used in the process of the invention.

The process of this invention for trichromatic dyeing or printing is susceptible of application to conventional dyeing and printing processes. In addition to water and the dyes, the dye liquors or print pastes may contain further auxiliaries such as wetting agents, antifoams, leveling agents or textile finishing agents such as fabric softeners, flame-proofing agents or dirt, water and oil repellants as well as water softeners and natural or synthetic thickeners, for example alginates and cellulose ethers.

The dyes of formula (1) and the process for trichromatic dyeing or printing are especially suitable for dyeing from short liquors, for example in continuous dyeing or in discontinuous and continuous foam dyeing processes.

When used for trichromatic dyeing or printing, the dyes of formula (1) and the dyes used in the process of the invention are distinguished by uniform build-up, good affinity, good consistency of shade, even at different concentrations, good fastness properties as well as in particular very good compatibility.

The dyes of formula (1) and the process for trichromatic dyeing or printing are suitable for dyeing or printing natural polyamide materials such as wool as well as in particular synthetic polyamide materials, for example polyamide 6 or polyamide 66, and are suitable for dyeing or printing wool and synthetic polyamide blend fabrics or yarns.

The textile material can be in any form of presentation as fibres, yarn, woven or knitted fabrics and, more particularly, carpets.

The azo dyes of formula (1) give level dyeings of good allround fastness properties, especially good fastness to rubbing, wet treatments, wet rubbing and light. The dyes of this invention are also readily soluble in water and resistant to hard water.

In the following Examples parts are by weight. The relationship between parts by weight and parts by volume is the same as that between the gram and the cubic centimeter.

EXAMPLE 1

A neutral hot solution of 70°-80° C. of 28 parts of 4-aminoazobenzene-4'-sulfonic acid in 500 parts of water is run simultaneously with 26 parts of an aqueous solution of sodium nitrite (4N) into a mixture of 28 parts of concentrated hydrochloric acid in 200 parts of water, while keeping the temperature of the reaction mixture at 20°-25° C. by addition of ice. Upon completion of the addition, the reaction mixture is stirred for 2 hours and eccess nitrite is destroyed with a small amount of amidosulfonic acid. The diazotisation mixture is slowly run into a cold solution of 0°-5° C. of 14 parts of 2,4-hexanedione and 180 parts of sodium acetate in 500 parts of water. After stirring for several hours at 0°-5° C., the batch is warmed to 30° C. to bring the reaction to completion and adjusted with sodium acetate to pH 5.5. The precipitate is thereafter filtered with suction and dried at 60° C., giving 30 parts of an orange powder.

8 parts of the reaction product obtained above are suspended at room temperature in 50 parts of glacial acetic acid and 20 parts of water. With stirring, 1.5 parts of hydrazine hydrate are added all at once. The reaction mixture is slowly heated to 100° C. and stirred until no more educt can be detected by thin-layer chromatography. After cooling to room temperature, the dye is precipitated with hydrochloric acid (2N). The precipitate is isolated by filtration, washed with a small amount of water and dried at 80° C., giving 7 parts of a dye which, in the form of the free acid, is the compound of formula

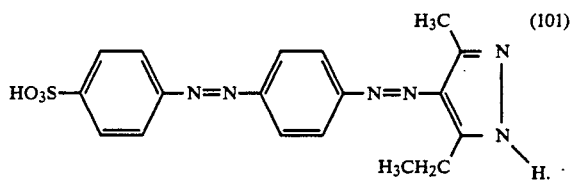

EXAMPLES 2-113

The procedure of Example 1 is repeated, using in place of 28 parts of 4-aminoazobenzene-4'-sulfonic acid an equimolar amount of a compound of formula $$HO_3S-\underset{5\ 6}{\overset{3\ 2}{\underset{4\ I\ 1}{\bigcirc}}}-N=N-\underset{}{\overset{}{\bigcirc}}II-NH_2, \qquad (7)$$

wherein the sulfo group is attached to the positions of the benzene ring I indicated in Table 1, column 2, and the benzene rings I and II carry no further substituents, and in place of 14 parts of 2,4-hexanedione an equimolar amount of a compound of formula $$\begin{array}{c} R_1 \\ \diagdown \\ C-OH, \\ \diagup\!\!\!\diagup \\ CH \\ \diagdown \\ C=O \\ \diagup \\ R_2 \end{array} \qquad (8)$$

wherein $R_1$ and $R_2$ have the meanings given in Table 1, columns 3 and 4, and in place of 1.5 parts of hydrazine hydrate an equimolar amount of a compound of formula $$H_2N-NH-R_3 \qquad (10),$$

wherein $R_3$ has the meanings given in Table 1, column 5, to give similar dyes which dye synthetic and natural polyamide materials in yellow shades. The use in the Examples of Table 1 of a compound of formula (8), wherein $R_1$ and $R_2$ have different meanings, together with a compound of formula (10), wherein $R_3$ is not hydrogen, gives isomeric mixtures of compounds of formulae

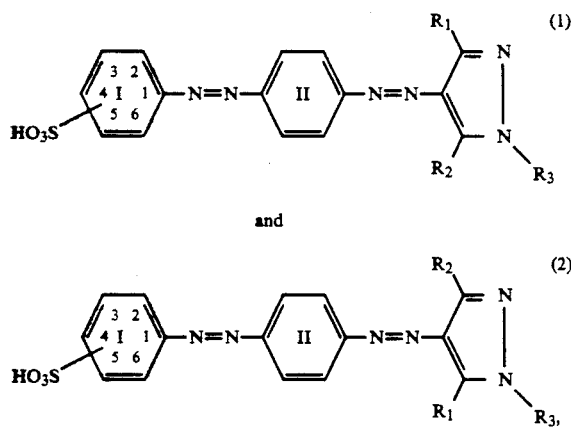

wherein $R_1$, $R_2$ and $R_3$ have the meanings given in Table 1, columns 3 to 5, and the sulfo group is attached to the benzene ring I in the positions indicated in column 2, and the benzene rings I and II carry no further substituents, which mixtures dye synthetic and natural polyamide materials in yellow shades.

TABLE 1

| Ex. | Substituent of benzene ring I | $R_1$ | $R_2$ | $R_3$ |
|---|---|---|---|---|
| 2 | 4-SO$_3$H | —CH$_3$ | —C$_2$H$_5$ | —CH$_3$ |
| 3 | 4-SO$_3$H | —CH$_3$ | —C$_2$H$_5$ | —C$_2$H$_5$ |
| 4 | 4-SO$_3$H | —CH$_3$ | —C$_2$H$_5$ | -n-C$_3$H$_7$ |
| 5 | 4-SO$_3$H | —CH$_3$ | —C$_2$H$_5$ | -iso-C$_3$H$_7$ |
| 6 | 4-SO$_3$H | —CH$_3$ | —C$_2$H$_5$ | -n-C$_4$H$_9$ |
| 7 | 4-SO$_3$H | —CH$_3$ | —C$_2$H$_5$ | -sec-C$_4$H$_9$ |
| 8 | 4-SO$_3$H | —CH$_3$ | —C$_2$H$_5$ | -tert-C$_4$H$_9$ |
| 9 | 4-SO$_3$H | —CH$_3$ | —C$_2$H$_5$ | -cyclo-C$_6$H$_{11}$ |
| 10 | 3-SO$_3$H | —CH$_3$ | —C$_2$H$_5$ | —H |
| 11 | 3-SO$_3$H | —CH$_3$ | —C$_2$H$_5$ | —CH$_3$ |
| 12 | 3-SO$_3$H | —CH$_3$ | —C$_2$H$_5$ | —C$_2$H$_5$ |
| 13 | 3-SO$_3$H | —CH$_3$ | —C$_2$H$_5$ | -n-C$_3$H$_7$ |
| 14 | 3-SO$_3$H | —CH$_3$ | —C$_2$H$_5$ | -iso-C$_3$H$_7$ |
| 15 | 3-SO$_3$H | —CH$_3$ | —C$_2$H$_5$ | -n-C$_4$H$_9$ |
| 16 | 3-SO$_3$H | —CH$_3$ | —C$_2$H$_5$ | -sec-C$_4$H$_9$ |
| 17 | 3-SO$_3$H | —CH$_3$ | —C$_2$H$_5$ | -tert-C$_4$H$_9$ |
| 18 | 3-SO$_3$H | —CH$_3$ | —C$_2$H$_5$ | -cyclo-C$_6$H$_{11}$ |
| 19 | 2-SO$_3$H | —CH$_3$ | —C$_2$H$_5$ | —H |
| 20 | 2-SO$_3$H | —CH$_3$ | —C$_2$H$_5$ | —CH$_3$ |
| 21 | 2-SO$_3$H | —CH$_3$ | —C$_2$H$_5$ | —C$_2$H$_5$ |
| 22 | 2-SO$_3$H | —CH$_3$ | —C$_2$H$_5$ | -n-C$_3$H$_7$ |
| 23 | 2-SO$_3$H | —CH$_3$ | —C$_2$H$_5$ | -iso-C$_3$H$_7$ |
| 24 | 2-SO$_3$H | —CH$_3$ | —C$_2$H$_5$ | -n-C$_4$H$_9$ |
| 25 | 2-SO$_3$H | —CH$_3$ | —C$_2$H$_5$ | -sec-C$_4$H$_9$ |
| 26 | 2-SO$_3$H | —CH$_3$ | —C$_2$H$_5$ | -tert-C$_4$H$_9$ |
| 27 | 2-SO$_3$H | —CH$_3$ | —C$_2$H$_5$ | -cyclo-C$_6$H$_{11}$ |
| 28 | 4-SO$_3$H | —C$_2$H$_5$ | —C$_2$H$_5$ | —H |
| 29 | 4-SO$_3$H | —C$_2$H$_5$ | —C$_2$H$_5$ | —CH$_3$ |
| 30 | 4-SO$_3$H | —C$_2$H$_5$ | —C$_2$H$_5$ | —C$_2$H$_5$ |
| 31 | 4-SO$_3$H | —C$_2$H$_5$ | —C$_2$H$_5$ | -n-C$_3$H$_7$ |
| 32 | 4-SO$_3$H | —C$_2$H$_5$ | —C$_2$H$_5$ | -iso-C$_3$H$_7$ |
| 33 | 4-SO$_3$H | —C$_2$H$_5$ | —C$_2$H$_5$ | -n-C$_4$H$_9$ |
| 34 | 4-SO$_3$H | —C$_2$H$_5$ | —C$_2$H$_5$ | -sec-C$_4$H$_9$ |
| 35 | 4-SO$_3$H | —C$_2$H$_5$ | —C$_2$H$_5$ | -tert-C$_4$H$_9$ |
| 36 | 4-SO$_3$H | —C$_2$H$_5$ | —C$_2$H$_5$ | -cyclo-C$_6$H$_{11}$ |
| 37 | 3-SO$_3$H | —C$_2$H$_5$ | —C$_2$H$_5$ | —H |
| 38 | 3-SO$_3$H | —C$_2$H$_5$ | —C$_2$H$_5$ | —CH$_3$ |
| 39 | 3-SO$_3$H | —C$_2$H$_5$ | —C$_2$H$_5$ | —C$_2$H$_5$ |
| 40 | 3-SO$_3$H | —C$_2$H$_5$ | —C$_2$H$_5$ | -n-C$_3$H$_7$ |
| 41 | 3-SO$_3$H | —C$_2$H$_5$ | —C$_2$H$_5$ | -iso-C$_3$H$_7$ |
| 42 | 3-SO$_3$H | —C$_2$H$_5$ | —C$_2$H$_5$ | -n-C$_4$H$_9$ |
| 43 | 3-SO$_3$H | —C$_2$H$_5$ | —C$_2$H$_5$ | -sec-C$_4$H$_9$ |
| 44 | 3-SO$_3$H | —C$_2$H$_5$ | —C$_2$H$_5$ | -tert-C$_4$H$_9$ |
| 45 | 3-SO$_3$H | —C$_2$H$_5$ | —C$_2$H$_5$ | -cyclo-C$_6$H$_{11}$ |
| 46 | 2-SO$_3$H | —C$_2$H$_5$ | —C$_2$H$_5$ | —H |
| 47 | 2-SO$_3$H | —C$_2$H$_5$ | —C$_2$H$_5$ | —CH$_3$ |
| 48 | 2-SO$_3$H | —C$_2$H$_5$ | —C$_2$H$_5$ | —C$_2$H$_5$ |
| 49 | 2-SO$_3$H | —C$_2$H$_5$ | —C$_2$H$_5$ | -n-C$_3$H$_7$ |
| 50 | 2-SO$_3$H | —C$_2$H$_5$ | —C$_2$H$_5$ | -n-C$_4$H$_9$ |
| 51 | 2-SO$_3$H | —C$_2$H$_5$ | —C$_2$H$_5$ | -sec-C$_4$H$_9$ |
| 52 | 2-SO$_3$H | —C$_2$H$_5$ | —C$_2$H$_5$ | -tert-C$_4$H$_9$ |
| 53 | 2-SO$_3$H | —C$_2$H$_5$ | —C$_2$H$_5$ | -cyclo-C$_6$H$_{11}$ |
| 54 | 4-SO$_3$H | —CH$_3$ | -n-C$_3$H$_7$ | —H |
| 55 | 4-SO$_3$H | —CH$_3$ | -n-C$_3$H$_7$ | —CH$_3$ |
| 56 | 4-SO$_3$H | —CH$_3$ | -n-C$_3$H$_7$ | —C$_2$H$_5$ |
| 57 | 4-SO$_3$H | —CH$_3$ | -n-C$_3$H$_7$ | -n-C$_3$H$_7$ |
| 58 | 4-SO$_3$H | —CH$_3$ | -n-C$_3$H$_7$ | -iso-C$_3$H$_7$ |
| 59 | 4-SO$_3$H | —CH$_3$ | -n-C$_3$H$_7$ | -sec-C$_4$H$_9$ |
| 60 | 4-SO$_3$H | —CH$_3$ | -n-C$_3$H$_7$ | -tert-C$_4$H$_9$ |
| 61 | 4-SO$_3$H | —CH$_3$ | -n-C$_3$H$_7$ | -cyclo-C$_6$H$_{11}$ |
| 62 | 3-SO$_3$H | —CH$_3$ | -n-C$_3$H$_7$ | —H |
| 63 | 3-SO$_3$H | —CH$_3$ | -n-C$_3$H$_7$ | —CH$_3$ |
| 64 | 3-SO$_3$H | —CH$_3$ | -n-C$_3$H$_7$ | —C$_2$H$_5$ |
| 65 | 3-SO$_3$H | —CH$_3$ | -n-C$_3$H$_7$ | -n-C$_3$H$_7$ |
| 66 | 3-SO$_3$H | —CH$_3$ | -n-C$_3$H$_7$ | -iso-C$_3$H$_7$ |
| 67 | 3-SO$_3$H | —CH$_3$ | -n-C$_3$H$_7$ | -sec-C$_4$H$_9$ |
| 68 | 3-SO$_3$H | —CH$_3$ | -n-C$_3$H$_7$ | -tert-C$_4$H$_9$ |
| 69 | 3-SO$_3$H | —CH$_3$ | -n-C$_3$H$_7$ | -cyclo-C$_6$H$_{11}$ |
| 70 | 2-SO$_3$H | —CH$_3$ | -n-C$_3$H$_7$ | —H |
| 71 | 2-SO$_3$H | —CH$_3$ | -n-C$_3$H$_7$ | —CH$_3$ |
| 72 | 2-SO$_3$H | —CH$_3$ | -n-C$_3$H$_7$ | —C$_2$H$_5$ |
| 73 | 2-SO$_3$H | —CH$_3$ | -n-C$_3$H$_7$ | -n-C$_3$H$_7$ |
| 74 | 2-SO$_3$H | —CH$_3$ | -n-C$_3$H$_7$ | -iso-C$_3$H$_7$ |
| 75 | 2-SO$_3$H | —CH$_3$ | -n-C$_3$H$_7$ | -sec-C$_4$H$_9$ |
| 76 | 2-SO$_3$H | —CH$_3$ | -n-C$_3$H$_7$ | -tert-C$_4$H$_9$ |
| 77 | 2-SO$_3$H | —CH$_3$ | -n-C$_3$H$_7$ | -cyclo-C$_6$H$_{11}$ |
| 78 | 4-SO$_3$H | —C$_2$H$_5$ | -n-C$_3$H$_7$ | —H |
| 79 | 4-SO$_3$H | —C$_2$H$_5$ | -n-C$_3$H$_7$ | —CH$_3$ |
| 80 | 4-SO$_3$H | —C$_2$H$_5$ | -n-C$_3$H$_7$ | —C$_2$H$_5$ |
| 81 | 4-SO$_3$H | —C$_2$H$_5$ | -n-C$_3$H$_7$ | -n-C$_3$H$_7$ |
| 82 | 4-SO$_3$H | —C$_2$H$_5$ | -n-C$_3$H$_7$ | -iso-C$_3$H$_7$ |
| 83 | 4-SO$_3$H | —C$_2$H$_5$ | -n-C$_3$H$_7$ | -sec-C$_4$H$_9$ |
| 84 | 4-SO$_3$H | —C$_2$H$_5$ | -n-C$_3$H$_7$ | -tert-C$_4$H$_9$ |
| 85 | 4-SO$_3$H | —C$_2$H$_5$ | -n-C$_3$H$_7$ | -cyclo-C$_6$H$_{11}$ |
| 86 | 3-SO$_3$H | —C$_2$H$_5$ | -n-C$_3$H$_7$ | —H |
| 87 | 3-SO$_3$H | —C$_2$H$_5$ | -n-C$_3$H$_7$ | —CH$_3$ |
| 88 | 3-SO$_3$H | —C$_2$H$_5$ | -n-C$_3$H$_7$ | —C$_2$H$_5$ |
| 89 | 3-SO$_3$H | —C$_2$H$_5$ | -n-C$_3$H$_7$ | -n-C$_3$H$_7$ |
| 90 | 3-SO$_3$H | —C$_2$H$_5$ | -n-C$_3$H$_7$ | -iso-C$_3$H$_7$ |
| 91 | 3-SO$_3$H | —C$_2$H$_5$ | -n-C$_3$H$_7$ | -sec-C$_4$H$_9$ |
| 92 | 3-SO$_3$H | —C$_2$H$_5$ | -n-C$_3$H$_7$ | -tert-C$_4$H$_9$ |
| 93 | 3-SO$_3$H | —C$_2$H$_5$ | -n-C$_3$H$_7$ | -cyclo-C$_6$H$_{11}$ |
| 94 | 2-SO$_3$H | —C$_2$H$_5$ | -n-C$_3$H$_7$ | —H |
| 95 | 2-SO$_3$H | —C$_2$H$_5$ | -n-C$_3$H$_7$ | —CH$_3$ |
| 96 | 2-SO$_3$H | —C$_2$H$_5$ | -n-C$_3$H$_7$ | —C$_2$H$_5$ |
| 97 | 2-SO$_3$H | —C$_2$H$_5$ | -n-C$_3$H$_7$ | -n-C$_3$H$_7$ |
| 98 | 2-SO$_3$H | —C$_2$H$_5$ | -n-C$_3$H$_7$ | -iso-C$_3$H$_7$ |
| 99 | 2-SO$_3$H | —C$_2$H$_5$ | -n-C$_3$H$_7$ | -sec-C$_4$H$_9$ |
| 100 | 2-SO$_3$H | —C$_2$H$_5$ | -n-C$_3$H$_7$ | -tert-C$_4$H$_9$ |
| 101 | 2-SO$_3$H | —C$_2$H$_5$ | -n-C$_3$H$_7$ | -cyclo-C$_6$H$_{11}$ |
| 102 | 4-SO$_3$H | -n-C$_3$H$_7$ | -n-C$_3$H$_7$ | —H |
| 103 | 4-SO$_3$H | —CH$_3$ | -n-C$_4$H$_9$ | —H |
| 104 | 4-SO$_3$H | —C$_2$H$_5$ | -n-C$_4$H$_9$ | —H |
| 105 | 4-SO$_3$H | -n-C$_3$H$_7$ | -n-C$_4$H$_9$ | —H |
| 106 | 4-SO$_3$H | -n-C$_4$H$_9$ | -n-C$_4$H$_9$ | —H |
| 107 | 3-SO$_3$H | -n-C$_3$H$_7$ | -n-C$_3$H$_7$ | —H |
| 108 | 3-SO$_3$H | —CH$_3$ | -n-C$_4$H$_9$ | —H |
| 109 | 3-SO$_3$H | —C$_2$H$_5$ | -n-C$_4$H$_9$ | —H |
| 110 | 3-SO$_3$H | -n-C$_3$H$_7$ | -n-C$_4$H$_9$ | —H |
| 111 | 3-SO$_3$H | -n-C$_4$H$_9$ | -n-C$_4$H$_9$ | —H |
| 112 | 3-SO$_3$H | -n-C$_3$H$_7$ | -n-C$_4$H$_9$ | —H |
| 113 | 4-SO$_3$H | —H | -tert-C$_4$H$_9$ | —H |

EXAMPLES 114–117

The procedure of Example 1 is repeated, using in place of 28 parts of 4-aminoazobenzene-4'-sulfonic acid an equimolar amount of an azo compound listed in Table 2, column 2, to give the dyes in the form of the free acid listed in column 3 which dye synthetic and natural polyamide materials in yellow shades.

TABLE 2

| Ex. | Azo compound | Dye |
|---|---|---|
| 114 | | |
| 115 | | |
| 116 | | |
| 117 | | |

(Structures shown in table)

EXAMPLE 118

The procedure of Example 114 is repeated, using in place of 14 parts of 2,4-hexanedione an equimolar amount of 3,5-heptanedione, to give the dye of formula

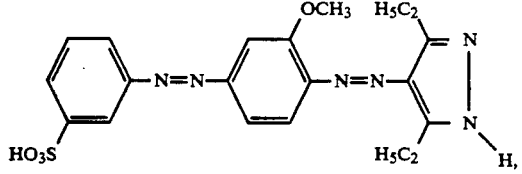

which dyes synthetic and natural polyamide materials in yellow shades.

DYEING EXAMPLE 1

10 parts of polyamide 66 material (Helanca tricot) are dyed in 500 parts of an aqueous liquor which contains 2 g/l of ammonium acetate and is adjusted with acetic acid to pH 5. The material is dyed with 0.05% of the red dye which, in the form of the free acid, has the formula

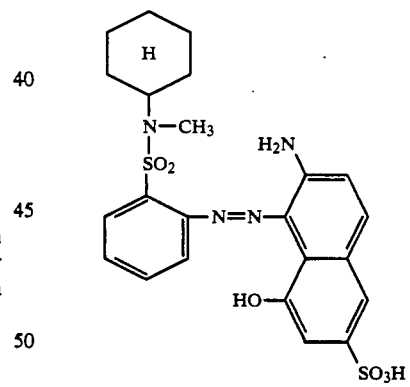

(102)

0.18% of the yellow dye which, in the form of the free acid, has the formula (101), and 0.17% of the blue dye which, in the form of the free acid, has the formula

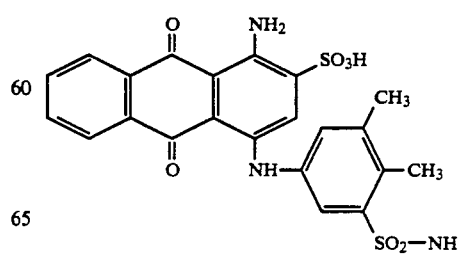

(103)

the percentages being based on the weight of the fabric.

The dyeing time at a temperature of 98° C. is 30–90 minutes. The dyed polyamide material is then removed from the bath and rinsed and dried in conventional manner. The material is dyed in a completely level brown shade which is entirely free from barriness caused by the physical properties of the material.

DYEING EXAMPLE 2

10 parts of polyamide 66 yarn are dyed in 400 parts of an aqueous liquor which contains 1.5 g/l of ammonium acetate and is adjusted with acetic acid to pH 5.5. The material is dyed with 0.1% of the dye of formula (102), 0.13% of the dye of formula (101) and 0.12% of the dye of formula (103), the percentages being based on the weight of the material. The dyebath is heated over 30 minutes to 98° C. and kept at 96°–98° C. for 60 minutes. The yarn is dyed in a brown shade.

DYEING EXAMPLE 3

10 parts of polyamide 66 carpet yarn are dyed in 400 parts of an aqueous liquor which contains 1.5 g/l of ammonium acetate and is adjusted with acetic acid to pH 5.5. The material is dyed with 0.15% of the red dye of formula

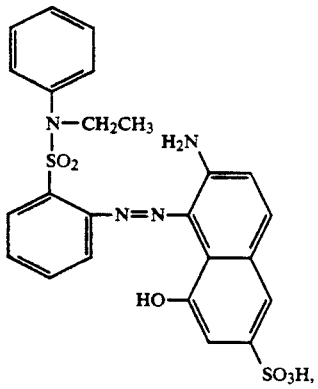

(104)

0.625% of the yellow dye of formula (101) and 0.52% of the blue dye of formula (103), the percentages being based on the weight of the material. The dyebath is heated over 30 minutes to 98° C. and kept at 96°–98° C. for 60 minutes. The dyed yarn is then removed from the bath and rinsed and dyed in conventional manner. The yarn is dyed in a brown shade.

DYEING EXAMPLE 4

The procedure of Dyeing Example 3 is repeated, using in place of the dyes of formulae (104), (101) and (103)
  0.32% of the dye of formula (102),
  0.46% of the dye of formula (101) and
  0.61% of the dye of formula (103) to give also yarn which is dyed in a brown shade.

DYEING EXAMPLE 5: (CARPET PRINTING)

A polyamide 6 velours carpet having a pile weight of 400 g/m² is padded for dyeing in a ground shade to a pick-up of 80% with an aqueous padding liquor of the following composition:
  0.1 g/l of the dye of formula (101),
  0.1 g/l of the dye of formula (103),
  2 g/l of a thickener based on natural polysaccharides,
  0.5 g/l of a wetting agent based on a sulfated alkylaryl polyglycolate, and
  0.5 g/l of an antifoam based on high-boiling alcohols.

The liquor is adjusted with acetic acid to pH 4.5. A pattern is applied to the pretreated carpet with a printing screen using a print paste of the following composition:
  1 g/l of the dye of formula (101),
  20 g/l of the dye of formula (102),
  10 g/l of the dye of formula (103),
  15 g/l of a thickener based on natural polysaccharides,
  2 g/l of a wetting agent based on a sulfated alkylaryl polyglycolate,
  1 g/l of an antifoam based on high-boiling alcohols.

The print paste is adjusted with acetic acid to pH 4.5

The printed material is subsequently treated with saturated steam of 101° C. to fix the dyes, rinsed, neutralised, rinsed once more and dried.

The velours carpet is dyed in a bordeaux pattern on a pale olive ground with very sharp contours. The dyeing has good penetration and exhibits no frosting.

DYEING EXAMPLE 6: (CONTINUOUS CARPET DYEING)

2.7 parts of the yellow dye of formula (101), 1.2 parts of the red dye of formula (102) and 1.3 parts of the blue dye of formula (103) are dissolved by brief boiling in 100 parts of water. This solution is then added to a solution comprising 3 parts of a thickener based on locust bean gum, 5.0 parts of a coacervate forming padding auxiliary based on a condensate of a higher molecular weight fatty acid with an oxyalkylamine, 2.0 parts of crystalline monosodium phosphate, and 1.0 part of crystalline disodium phosphate in 500 parts of cold water. The liquor is then bulked with cold water to 1000 parts. Then 300% of this liquor, which has a pH of 5.5–6.5, based on the weight of the carpet, is applied to an undyed polyamide 66 tufted carpet at a carpet speed of 8 meters per minute. The impregnated carpet passes into a festoon steamer, where it is treated for 10 minutes with saturated steam of 98°–100° C.

The carpet is thereafter washed in an open-width washing machine. It is dyed in a neutral brown shade.

DYEING EXAMPLE 7

The procedure of Example 6 is repeated, using in place of 1.2 parts of the yellow dye of formula (101) 1.2 parts of the yellow dye of Example 2 or 1.2 parts of the yellow dye of Example 114, to give a carpet which is dyed in a brown shade.

What is claimed is:

1. An azo dye of formula

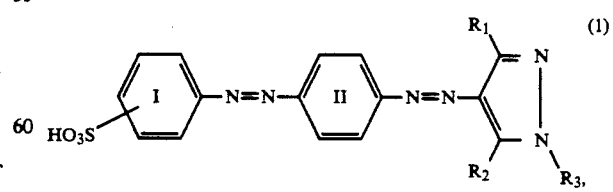

(1)

wherein $R_1$ is hydrogen or $C_1$–$C_4$alkyl, $R_2$ is $C_2$–$C_4$alkyl, $R_3$ is hydrogen, $C_1$–$C_4$alkyl or unsubstituted or substituted $C_5$–$C_7$cycloalkyl or phenyl, and the benzene rings I and II are independently of one another either unsubstituted or substituted with a substituent selected from the group consisting of $C_1$-$C_4$alkyl, $C_1$-$C_4$alkoxy, $C_2$-$C_4$alkanoylamino, hydroxy, sulfo, cyan, nitro, sulfamoyl, fluoro, chloro and bromo.

2. An azo dye according to claim 1, wherein $R_1$ is methyl or ethyl.

3. An azo dye according to claim 1, wherein $R_2$ is ethyl.

4. An azo dye according to claim 1, wherein $R_3$ is hydrogen.

5. An azo dye according to claim 1, wherein the sulfo group is attached to the benzene ring I in meta- or para-position to the azo group.

6. An azo dye according to claim 1, of formula

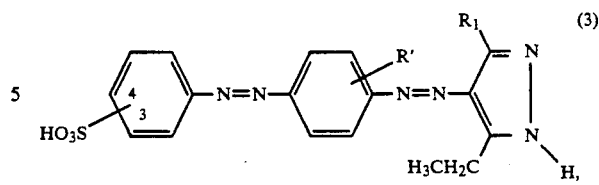

wherein $R_1$ is methyl or ethyl and R' is hydrogen or methoxy, and the sulfo group is attached to the benzene ring in the indicated 3- or 4-position.

* * * * *